(12) United States Patent
Saracco et al.

(10) Patent No.: US 9,917,410 B2
(45) Date of Patent: Mar. 13, 2018

(54) OPTICAL MODE FILTER EMPLOYING RADIALLY ASYMMETRIC FIBER

(71) Applicants: Matthieu Saracco, Vancouver, WA (US); David N. Logan, Vancouver, WA (US); Timothy S. McComb, Vancouver, WA (US); Roger L. Farrow, Vancouver, WA (US)

(72) Inventors: Matthieu Saracco, Vancouver, WA (US); David N. Logan, Vancouver, WA (US); Timothy S. McComb, Vancouver, WA (US); Roger L. Farrow, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/362,705

(22) Filed: Nov. 28, 2016

(65) Prior Publication Data

US 2017/0162999 A1    Jun. 8, 2017

Related U.S. Application Data

(60) Provisional application No. 62/263,526, filed on Dec. 4, 2015.

(51) Int. Cl.
*H01S 3/08* (2006.01)
*H01S 3/10* (2006.01)
(Continued)

(52) U.S. Cl.
CPC ............ *H01S 3/06704* (2013.01); *G02B 6/14* (2013.01); *G02F 1/0134* (2013.01);
(Continued)

(58) Field of Classification Search
CPC ............ H01S 3/06704; H01S 3/06712; H01S 3/06729; H01S 3/06754; G02B 6/14; G02B 6/02023
See application file for complete search history.

(56) References Cited

U.S. PATENT DOCUMENTS 6,424,784 B1    7/2002    Olson
6,496,301 B1 *  12/2002   Koplow ................... G02B 6/14
                                                    359/337
(Continued)

FOREIGN PATENT DOCUMENTS

WO      2005031401      4/2005

OTHER PUBLICATIONS

Drexler, P. et al., "Optical Fiber Birefringence Effects—Sources, Utilization and Methods of Suppression", Recent Progress in Optical Fiber Research, InTech, DOI: 10.5772/27517; retrieved online via https://www.intechopen.com/books; 2012.

*Primary Examiner* — Eric Bolda
(74) *Attorney, Agent, or Firm* — Green, Howard & Mughal LLP

(57) ABSTRACT

Fiber amplifier and/or mode filter including a linearly birefringent LMA fiber coiled at a radius of curvature over a bend length to differentiate a fundamental optical mode from supported higher-order modes through bending losses. The LMA fiber may be a polarization-maintaining (PM) fiber having a variety of geometrical core shapes and cladding configurations. In some embodiments, the birefringent LMA fiber includes a radially asymmetric core that is angularly rotated over a length of the coiled fiber to ensure bending losses are experienced in orthogonally oriented higher-order modes associated with some orientation relative to the core orientation. In some embodiments, the fiber coiling is two-dimensional with bending occurring only about one axis. In some embodiments, an asymmetric core is pre-spun to a predetermined axial spin profile. In some embodiments, angular rotation of the core is achieved through mechanically twisting an un-spun fiber over a length of the coil.

20 Claims, 6 Drawing Sheets

(51) Int. Cl.
  *G02B 6/14*  (2006.01)
  *G02B 6/02*  (2006.01)
  *H01S 3/067* (2006.01)
  *G02F 1/01*  (2006.01)
  *H01S 3/16*  (2006.01)

(52) U.S. Cl.
  CPC ...... *H01S 3/06754* (2013.01); *H01S 3/08045* (2013.01); *H01S 3/10023* (2013.01); *H01S 3/1618* (2013.01)

(56) References Cited

U.S. PATENT DOCUMENTS

| | | | |
|---|---|---|---|
| 8,711,471 B2* | 4/2014 | Liu | G02B 6/14 |
| | | | 359/337 |
| 2003/0095578 A1* | 5/2003 | Kopp, II | G02B 6/02085 |
| | | | 372/6 |
| 2008/0267575 A1 | 10/2008 | Seifert | |
| 2009/0034059 A1* | 2/2009 | Fini | G02B 6/02023 |
| | | | 359/341.3 |
| 2011/0058250 A1 | 3/2011 | Liu et al. | |
| 2014/0268310 A1* | 9/2014 | Ye | G02B 6/02 |
| | | | 359/341.1 |
| 2016/0013607 A1* | 1/2016 | McComb | H01S 3/06704 |
| | | | 372/6 |

* cited by examiner

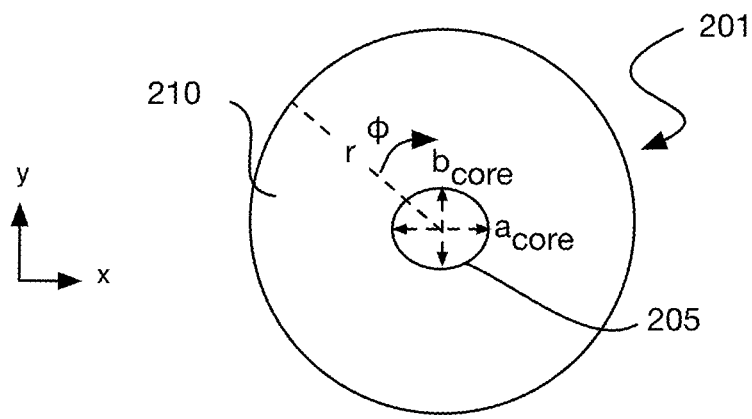
FIG. 2A
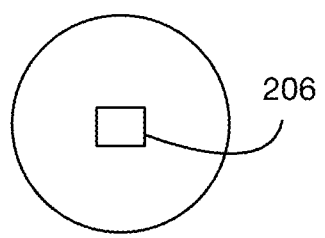   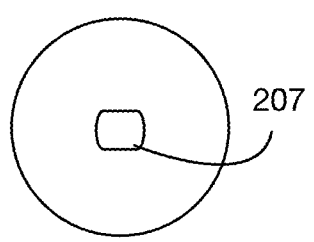   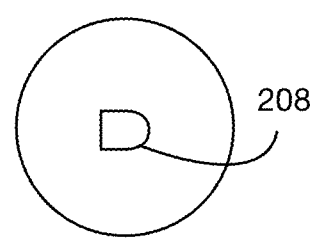
FIG. 2B    FIG. 2C    FIG. 2D
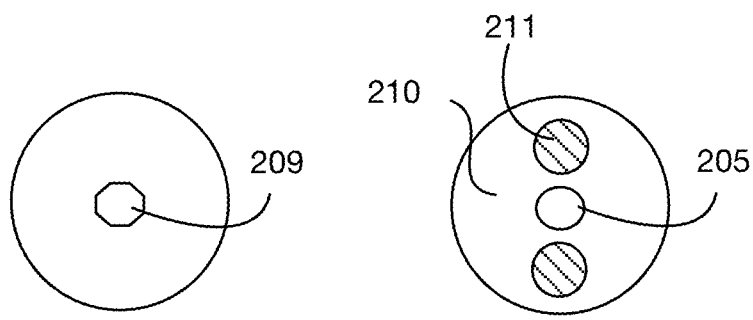
FIG. 2E    FIG. 2F

OPTICAL MODE FILTER EMPLOYING RADIALLY ASYMMETRIC FIBER

CLAIM FOR PRIORITY

This application claims priority to U.S. Provisional Patent Application Ser. No. 62/263,526, filed on Dec. 4, 2015, and titled "OPTICAL MODE FILTER EMPLOYING RADIALLY ASYMMETRIC FIBER", which is incorporated by reference in its entirety.

BACKGROUND

The fiber laser industry continues to increase laser performance metrics, such as average power, pulse energy and peak power. Increasing the average power of fiber lasers is largely driven by the brightness of laser diode pumps and the ability to couple power into fiber. Pulse energy and peak power on the other hand are respectively driven by the ability to store and extract energy in the fiber while mitigating the nonlinear processes than can have adverse impacts on the temporal and spectral content of the output pulse. Both of these issues can be effectively addressed by using fibers with large core sizes.

The fundamental transverse mode of an optical fiber $LP_{01}$ has desirable characteristics in terms of beam shape, minimal beam expansion during propagation through free space (often referred to as "diffraction limited"), and optimum focus-ability. Hence, fundamental mode $LP_{01}$ propagation is often preferred in the fiber laser industry. In reference to FIG. 1A illustrating a cross-sectional view of a conventional fiber 101, as the diameter of core 105 is increased, fiber 101 begins to support the propagation of more than one transverse optical mode. The number of modes supported in a fiber scales with the V-number. The V-number is proportional to the core diameter $d_{core}$ and core numerical aperture $NA_{core}$ of the fiber and inversely proportional to the wavelength $\lambda$ of the light propagating in the fiber:

$$V = \frac{\pi d_{core} NA_{core}}{\lambda} \quad (1)$$

In some operating regimes, the number of modes supported by a fiber is given by roughly one half the square of the V-number.

$$M_{multimode} \approx \frac{4V^2}{\pi^2} \quad (2)$$

It can be shown that a fiber with a V-number less than about 2.4 supports the propagation of only the fundamental mode. In Large Mode Area (LMA) optical fibers having a V-number over 2.4, several optical modes may propagate. In LMA fiber, higher-order modes (e.g., $LP_{11}$ being the next highest mode) may be stripped out of the core of the fiber in favor of $LP_{01}$ mode propagation. LMA can therefore be distinguished from strongly multimode fiber that supports hundreds of modes, and for which light is not to be guided dominantly in the fundamental mode. One conventional technique to discriminate against the higher-order modes is to coil a LMA fiber at a certain bending radius because higher-order modes typically experience more bending loss than does the fundamental mode. FIG. 1B illustrates a graph of bend loss for an exemplary LMA fiber 101 with a 25 µm diameter core, 0.07NA that supports 5 modes for light with a wavelength around 1 µm.

U.S. Pat. No. 8,711,471, which is incorporated herein by reference in its entirety for all purposes, discloses an optical mode filter employing a three dimensional (3D) mandrel upon which a multimode fiber, such as LMA fiber 101, may be coiled about two orthogonal bending axes to enable stripping of higher-order modes having orthogonal orientations. LMA fiber optical mode filters that offer a similar higher-order mode stripping efficiency, but with a simplified mechanical design may offer many commercial advantages, including a smaller form factor and/or a lower cost.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 2A, 2B, 2C, 2D, 2E and 2F are cross-sectional views of polarization-maintaining LMA fiber with the optical fiber axis perpendicular to the plane of the page, in accordance with some embodiments;

DETAILED DESCRIPTION

Figure 1A:
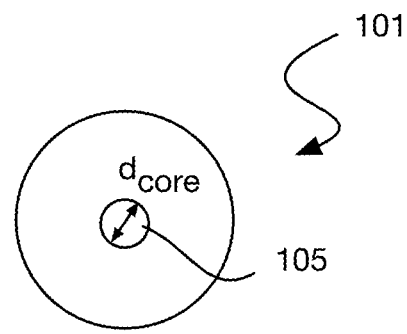
FIG. 1A is a cross-sectional view of conventional LMA fiber.
Figure 1B:
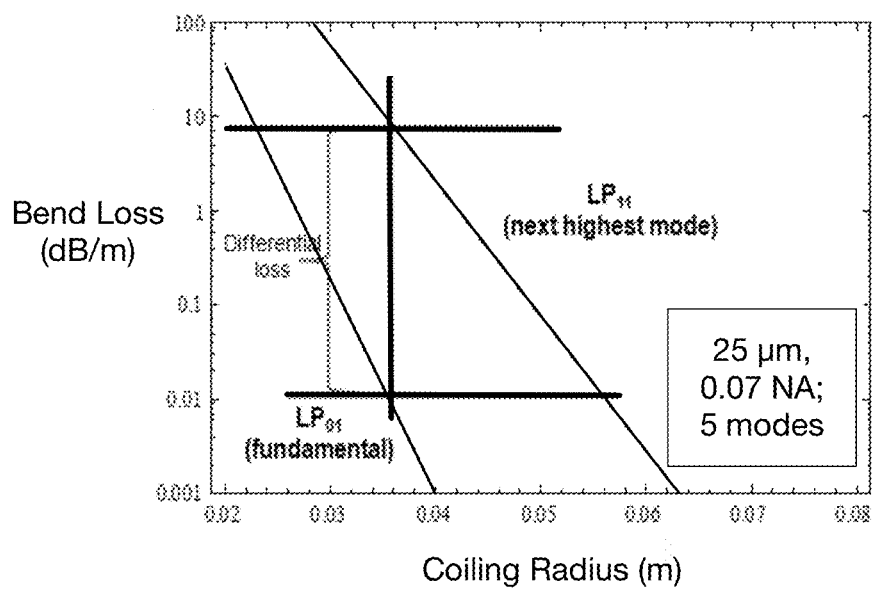
FIG. 1B is a graph illustrating bending loss for the fundamental mode and a higher-order mode in the conventional LMA fiber illustrated in FIG. 1A.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings. Therefore, the following detailed description is not to be taken in a limiting sense and the scope of claimed subject matter is defined solely by the appended claims and their equivalents.

In the following description, numerous details are set forth. However, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "one embodiment" means that a particular feature, structure, function, or characteristic described in connection with the embodiment is included in at least one embodiment of the invention. Thus, the appearances of the phrase "in an embodiment" or "in one embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship).

The terms "over," "under," "between," and "on" as used herein refer to a relative position of one component or material with respect to other components or materials where such physical relationships are noteworthy.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

Described herein are optical fiber amplifiers including mode filters employing coiled linearly birefringent LMA fiber to differentiate the fundamental mode from higher-order modes through bending losses. The LMA fiber may be a polarization-maintaining (PM) fiber having any of a variety of geometrical core shapes and cladding configurations. In some embodiments, the birefringent LMA fiber includes a radially asymmetric core. Higher-order modes are therefore oriented with respect to the core orientation, which is angularly rotated over a length of a coiled fiber to ensure bending losses are experienced in orthogonally oriented higher-order modes. In some embodiments, the fiber coiling is two-dimensional (2D) with bending occurring only about one axis of curvature rather than two orthogonal axes of curvature. Hence, by controlling an azimuthal angle of a radially asymmetric core about the fiber axis, which is perpendicular to the axis of curvature, higher-order modes may be efficiently stripped by coiling in a single plane rather than a more complex three-dimensional coiling scheme. As such, an efficient mode filter may be implemented without multiple mandrels and/or without a mandrel of complex geometry. In some embodiments, a radially asymmetric core is pre-spun to a predetermined profile. In some embodiments, angular rotation of the core is achieved through mechanically twisting an un-spun fiber over the length of the coil. In some advantageous embodiments, the coiled linearly birefringent LMA fiber is active, doped with a gain media. For such embodiments, attenuation of orthogonal higher-order modes is to exceed the gain of such modes over the length of the amplifying mode filter.

In some embodiments, a linearly birefringent fiber is employed along a length of LMA fiber that is bent to a predetermined radius of curvature around a single axis of curvature that is non-parallel to the fiber axis, referred to herein as a bend length. The single axis of curvature allows for a relatively simple 2D coiling path. The bend length is the length of bent fiber required to attenuate all higher-order modes by some predetermined threshold (e.g., 3 dB higher-order modal suppression, 10 dB, etc.). Depending on the 2D coiling path, the bend length need not be continuous and may instead be accumulated by incremental bends separated by straight runs (e.g., as for a racetrack coiling path). To advantageously minimize bending loss incurred by the fundamental mode, the bend length may be minimized to achieve a desired higher-order modal attenuation target.

Each transverse mode supported by an optical fiber waveguide can exist in two orthogonal polarizations (e.g., vertical and horizontal). In a perfectly symmetric optical fiber the two polarization modes propagate at the same speed, independent of one another (i.e., the fiber is not birefringent). Random refractive-index perturbations from mechanical strain, and/or uncontrolled levels of core or cladding ellipticity induce random birefringence in such a fiber, resulting in non-polarization-maintaining behavior. In a polarization-maintaining (PM) optical fiber however, a relatively large radial asymmetry is introduced intentionally during the fiber manufacturing process to create a controlled linear birefringence oriented along a known azimuth angle about the fiber axis. If the linear birefringence is significantly larger than uncontrolled birefringence, good PM behavior is obtained in the fiber.

In some embodiments, linear birefringence is provided, at least in part, by a radially asymmetric LMA fiber. The radial asymmetry extends along the bend length of the LMA fiber. In a radially asymmetric fiber, the transverse refractive index depends not only on the radial coordinate r, but also on the azimuthal coordinate $\phi$. In other words, the fiber has an azimuthally asymmetric refractive-index profile. In some advantageous embodiments, an LMA fiber core has radial asymmetry. FIG. 2A is cross-sectional view of a polarization-maintaining LMA fiber 201 in accordance with some embodiments. In FIG. 2A, the optical fiber axis is perpendicular to the plane of the page. Fiber 201 is a single clad (SC) LMA fiber including an elliptical core 205 surrounded by cladding 210. LMA fiber 201 has a V-number greater than 2.4, advantageously at least 4, and may be 5, 10 or even as high as 20. Although LMA is multimode fiber, it can be rendered single mode through bending losses. Elliptical core 205 is has a major axis $a_{core}$ and minor axis $b_{core}$. Although core dimension may vary with application, in advantageous embodiments, major axis $a_{core}$ is no larger than 35 µm, and advantageously 12-25 µm. Ellipticity of the core may vary with implementation, and may be as little as a few percent out-of-round up to 10-20 percent. In some advantageous embodiments, major axis $a_{core}$ is at least 5% larger than minor axis $b_{core}$. In some other embodiments, major axis $a_{core}$ is at least 10% larger than minor axis $b_{core}$.

Asymmetrical core shapes may be other than elliptical. FIGS. 2B, 2C, and 2D are cross-sectional views of SC LMA PM fiber that may be employed along a fiber bend length, in accordance with some alternate embodiments. For example, square and/or rectangular cores 206 (FIG. 2B), or racetrack cores 207 (FIG. 2C) may offer levels of birefringence similar to that of elliptical core 205. Radial core asymmetry may have n-fold rotational symmetry where rotation by an angle of 360°/n does not change the object. The core may therefore have more or less asymmetry than elliptical core 205. For example, along a bend length, the LMA fiber may also have a D-core 208 (FIG. 2D) with only one-fold symmetry, or an octagonal core 209 (FIG. 2C) with eight-fold symmetry. LMA PM fiber may also include stress rods in the cladding. As shown in FIG. 2F for example, in addition to elliptical core 205, cladding 210 includes stress rods 211. Stress rods 211 are known to induce linear birefringence based on internal fiber stress, and may increase birefringence beyond that possible with elliptical core 205 alone. Stress rods 211 may be of any material (e.g. aluminum and/or boron-doped glass), and take any geometric form, such as the illustrated PANDA pattern, a bow-tie pattern, etc. Similarly radially asymmetric cores may also be double clad (DC).

In some embodiments, radially asymmetric LMA fiber is angularly rotated about the fiber axis over a bend length. This angular rotation is to ensure higher-order modes orthogonal to each other experience sufficient bending losses over the bend length to reach the target attenuation. Bending losses are greater for modes orthogonal to the axis of curvature than for modes parallel to the axis of curvature. With polarization-maintenance, higher-order modes remain oriented relative to a reference core axis (e.g., major axis $a_{core}$ for LMA fiber 201) over the bend length. Angular rotation about the fiber axis (i.e., axial rotation) over the bend length therefore rotates the mode density distribution in sync with the core orientation. Control of the core orientation relative to the axis of curvature can then ensure a proper (e.g., minimal) fiber bend length within a single bending plane sufficiently attenuates any/all higher-order modes.

Figure 3A:
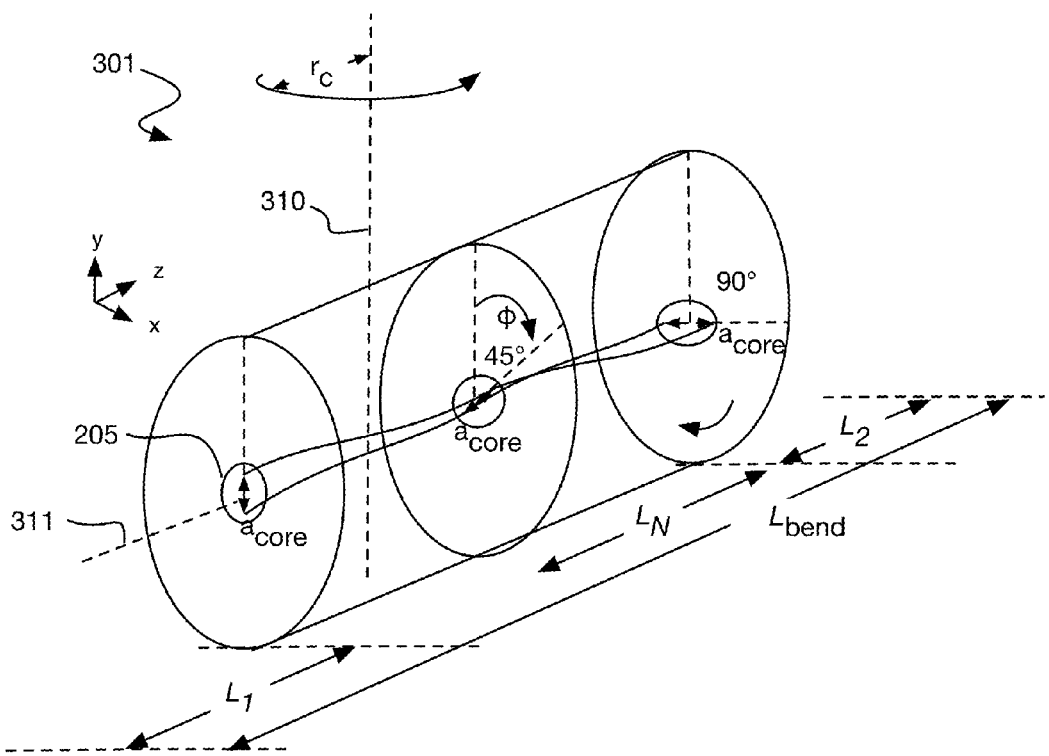
FIG. 3A illustrates a spun asymmetrical core LMA fiber, in accordance with some embodiments.

FIG. 3A illustrates a spun asymmetric LMA PM fiber 301, in accordance with some embodiments having an asymmetrical core. As shown, along bend length $L_{bend}$, fiber 301 is to bend about axis of curvature 310, orthogonal to fiber axis 311. Axis of curvature 310 (e.g., y-dimension) defines a 2D bending plane (x-z dimensions). Within the bending plane, fiber 301 is to follow a path associated with one or more predetermined radius of curvature $r_c$. The radius of curvature along the bend length may be constant (fixed) or non-constant (varying), but is to be controlled to create a substantially higher loss for at least one higher-order mode than for the fundamental mode. While the radius of curvature may vary with implementation, in exemplary embodiments where LMA PM fiber 301 has a core diameter of around 25 µm and NA of around 0.07, radius of curvature $r_c$ is between 5-50 cm.

Over bend length $L_{bend}$, and/or between consecutive portions of the bend length $L_{bend}$ (e.g., between first bend length portion $L_1$ and second bend length portion $L_2$), elliptical core 205 is angularly rotated about fiber axis 311 by azimuthal angle φ. The angular rotation of the core, also referred to as spin, may be in the form of a pre-spun LMA PM fiber, achieved through a mechanical twisting of an un-spun LMA PM fiber, or a some combination of both (e.g., a spun fiber have a pre-determined spin profile further twisted to achieve a desired bend length at a given core orientation relative to the bend axis). In a pre-spun fiber, azimuthal angle φ is defined as a function of length (i.e., the spin profile) at the time of drawing the fiber. As such, the spin profile remains fixed within a relaxed length of pre-spun fiber. In contrast, mechanical twisting of the fiber performed at the time of wrapping or coiling the fiber about the bend axis places the fiber under torsional strain in addition to bending strain. The spin profile of a pre-spun fiber may be deduced by inspection with a microscope index-matched to the cladding based on the shape of the core and/or presence of markers on the fiber. The spin profile of a mechanically twisted fiber can be determined by mapping a fiber's controlled relaxation as it unwinds.

In some embodiments, angular rotation of a LMA PM fiber core about the fiber axis is at least 90° over a bend length that attenuates all higher-order modes by some threshold (e.g., 3 dB, 10 dB, etc.). Angular rotation of a LMA PM fiber core about the fiber axis may also be larger, for example 180° over a bend length. In the exemplary embodiment illustrated in FIG. 3A, over bend length $L_{bend}$, the major axis of elliptical core 205 rotates from an azimuthal angle φ=0° where it is parallel to axis of curvature 310, to an azimuthal angle φ=90° where it is perpendicular to axis of curvature 310. If all higher-order modes have substantially the same attenuation coefficient (dB/m) for the radius of curvature, then the spin profile may be linear with a constant rate of core rotation (δφ/L) over the bend length. For embodiments where the angular rotation is 90° over a bend length and the spin profile is linear, the core axis will be at approximately 45° at half the bend length. However, in some embodiments, for example where the attenuation coefficient is not the same for all higher-order modes, the rate of the angular rotation as a function of fiber length varies over the bend length. Such a spin profile may minimize bending loss incurred by the fundamental mode because the bend length at a given radius of curvature may be minimized for a given higher-order modal attenuation target. In some embodiments therefore, the angular position of the core as a function of fiber length (i.e., core rotation rate) varies over a bend length that attenuates all higher-order modes by some threshold (e.g., 3 dB, 10 dB, etc. for propagation in an $LP_{11}$ mode in any orientation.).

With a non-linear spin profile, apportionment of the bend length to a given azimuthal angle φ may vary over the range of azimuthal angles spanned by a bend length. In some advantageous embodiments where modal loss for a given bend length differs across the higher-order modes, a non-linear spin profile is predetermined with the objective of attenuating all higher-order modes by at least 3 dB over the bend length, advantageously by at least 10 dB over the bend length, and more advantageously 20 dB over the bend length. Thus, azimuthal angle φ=0° (e.g., parallel to axis of curvature 310) may be maintained over a cumulative first bend length portion $L_1$ determined to be the minimum bend length for a first higher-order mode to attenuate be 10 dB. Azimuthal angle φ=90° (e.g., perpendicular to axis of curvature 310) may be maintained over a cumulative second bend length portion $L_2$ determined to be the minimum bend length for a second higher-order mode to attenuate be 10 dB. Where the first higher-order mode experiences higher bending loss than does the second higher-order mode, bend length portion $L_1$ is to be shorter than bend length portion $L_2$. Intermediate azimuthal angles (e.g., 45°) may be likewise maintained over a bend length portion $L_N$.

Figure 3B:
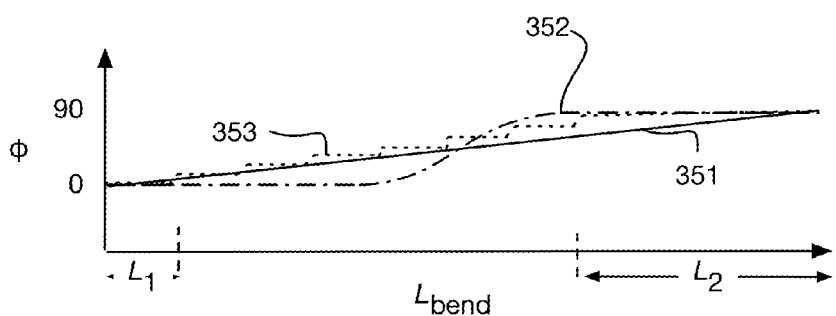
FIG. 3B illustrates exemplary spin profiles associated with various 2D coil paths and/or higher-order attenuation coefficients, in accordance with some embodiments.

FIG. 3B illustrates exemplary spin profiles associated with various 2D coil paths and/or higher-order attenuation coefficients, in accordance with some embodiments. In the simplest implementation, a linear spin profile 351 apportions a bend length equally over all azimuth angles spanned (e.g., 90°). The rate of angular rotation may be determined as a function of an attenuation coefficient for the bend radius and the desired level of higher-order modal suppression. Non-linear spin profile 352 apportions bend length unequally over the azimuth angles. Spin profile 352 apportions most of the bend length to two orthogonal modes, for example orthogonal orientations of the least lossy mode (e.g., $L_{11,e}$, $L_{11,o}$). In some further embodiments, where modal suppression coefficient of a first higher mode over the first portion of the bend length ($L_1$) is less than modal suppression coefficient associated with a second higher mode over the second portion of the bend length ($L_2$), $L_1$ is longer than $L_2$. Spin profile 353 is stepped over various angular positions, with each position maintained over a predetermined bend length portion. Such a stepped profile may be easily implemented in a 2D racetrack path with incremental rotation occurring periodically along straight fiber runs between curved segments. A number of wraps between indexed angular positions may be controlled to readily apportion a bend length.

Figure 4A:
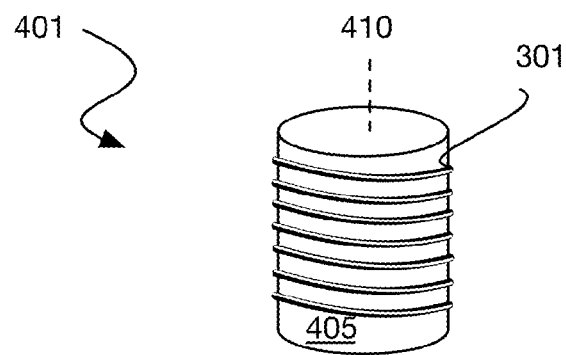
FIGS. 4A, 4B, and 4C are isometric views of mode filters employing asymmetrical core multimode fiber, in accordance with some embodiments.
Figure 4B:
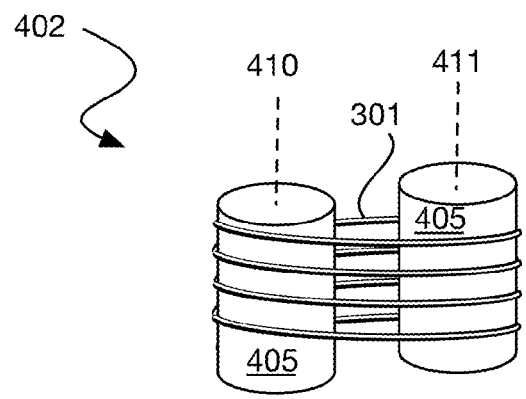
Figure 4C:
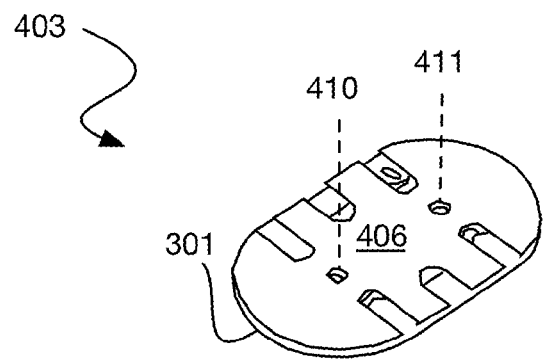

Optical mode filters employing spun asymmetrical core LMA fiber having one or more of the attributes described above may be implemented with a number of inexpensive and small form-factor 2D mandrels configured to control the fiber path within the filter. FIGS. 4A, 4B, and 4C are isometric views of mode filters employing asymmetrical core multimode fiber, in accordance with some exemplary embodiments. In FIG. 4A, an optical mode filter 401 includes a cylindrical mandrel 405. Mandrel 405 has a longitudinal axis 410 parallel to the axis of curvature and defines a fixed radius of curvature over the bend length. The radius may vary, for example between about 5-50 cm. The length of fiber 301 coiled about mandrel 405 (e.g., 1-20 meter) is angularly rotated (e.g., 90°), for example according to any of the parameters described elsewhere herein to provide 10-20 dB attenuation of all higher-order modes. In some advantageous embodiments, the rate of the angular rotation as a function of fiber length varies over the bend length.

In FIG. 4B, an optical mode filter 402 includes two cylindrical mandrels 405 having parallel longitudinal axes 410, 411 defining two parallel axes of curvature. Although a circular wrap is illustrated, a figure-8 wrap may also be employed. The two axes of curvature may be associated with the same or different radius of curvature that may be constant or varying to define a fixed or variable radius of curvature over a bend length. Mandrels 405 define an exemplary 2D circle-straight-circle path. In some embodiments, azimuthal angle of LMA PM fiber 301 is incrementally rotated relative to the axes of curvature along the bend length. In some such embodiments, the fiber axial rotation is positioned along straight fiber runs with a predetermined number of wraps between consecutive angular positions.

In FIG. 4C, an optical mode filter 403 includes a 2D racetrack mandrel 406 having longitudinal axes 410, 411 defining a 2D fiber path with a predetermined radii of curvature. The two axes of curvature may be associated with the same or different radius of curvature that may be constant or varying to define a fixed or variable radius of curvature over a bend length. For example, in some embodiments the radii of curvature increase by a width of the fiber with each full wrap. As with filter 402, an azimuthal angle of LMA PM fiber may be incrementally rotated axially along the bend length. For example, the fiber axial rotations may be located within straight fiber runs with a predetermined number of wraps between consecutive angular positions.

Notably, while the mode filters illustrated above depict mandrels, such supports are not required. For example, in alternative embodiments, a fiber can be coiled into a 2D plane having a desired radius of curvature and held in free-space. In some embodiments, the fiber is contained within a thermoplastic jacket. Once a selected bend length has been achieved, the jacket is cooled so that fiber curvature and axial rotation is fixed. Instead of including support in the mode filter, the support can be used to form multiple mode filters. For example, a jacketed fiber with a softened jacket can be wound about a cylinder with desired spin profile. Upon cooling the jacket, the fiber can retain the curvature associated with the winding. In other examples, a fiber and jacket are suitably shaped, and an epoxy is injected into a space between the jacket and the fiber. In other examples, the fiber can be coating with a thermoplastic or an epoxy, and frozen into a desired curvature.

Figure 5A:
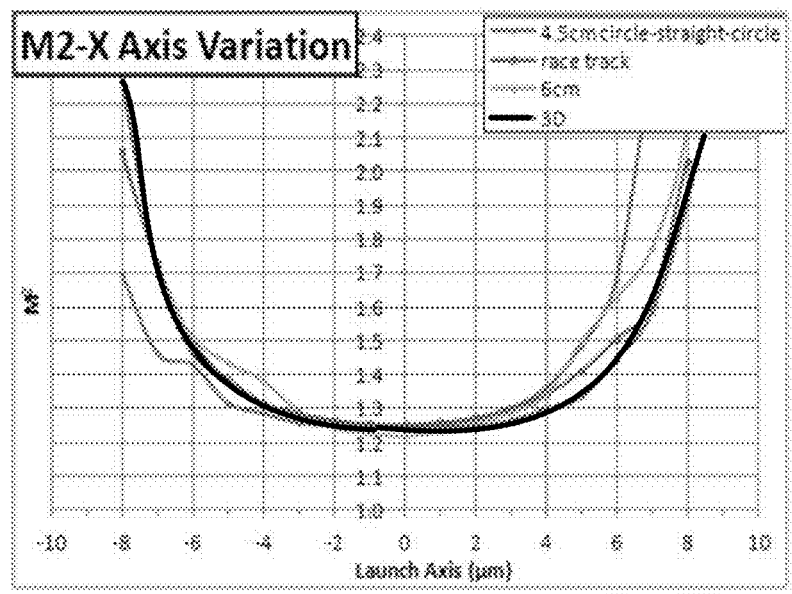
FIGS. 5A and 5B are graphs comparing a mode filter employing symmetric LMA fiber to mode filters employing LMA PM fiber in accordance with some embodiments.
Figure 5B:
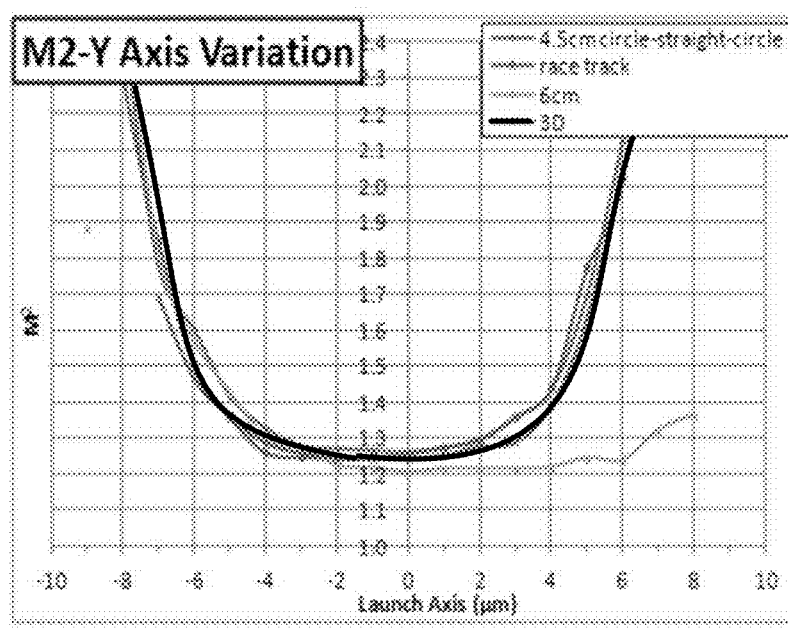

FIGS. 5A and 5B are graphs comparing the beam quality as a function of launch position for 2D mode filters 401-403 employing asymmetric LMA PM fiber in accordance with some embodiments to that of a mode filter employing more complex 3D bending of a symmetric LMA fiber. As shown, for all but the 6 cm cylindrical mandrel 401, $M^2$ for a 25 μm LMA PM fiber twisted as it is wrapped around a 2D mandrel displays similar beam quality dependence on launch position as the mode filter employing radially symmetric fiber wrapped about a 3D mandrel. This comparable beam quality response indicates a 2D mode filter in accordance with embodiments can provide higher-order mode filtering comparable to that of a 3D mode filter.

In some embodiments, LMA fiber with an asymmetric core in accordance with embodiments is employed as a passive filter. In some alternative embodiments, LMA fiber with an asymmetric core is employed in an active mode filter including an active fiber doped with one or more rare-earth element over the bend length. For such fiber laser embodiments, the fundamental mode is amplified beyond any bending loss while attenuation of the higher-order modes through bending loss exceeds their amplification. The fundamental mode of a seed laser launched into the fiber laser is typically not the same as the fundamental mode of the active optical fiber. Higher-order modes of the multimode optical fiber will typically be excited to some extent absent some means of attenuation, such those described herein. For fiber laser embodiments, the core and/or cladding along the bending length may be doped with any rare earth element known suitable for the purpose, such as, but not limited to Yb, Nd, and Er. The active fiber may be core pumped (SC) or cladding pumped (double clad) following any technique known in the art. In the fiber laser, pump light from an optical pump source may be counter-propagating or co-propagating with light from a seed light source following any technique known in the art.

Figure 6A:
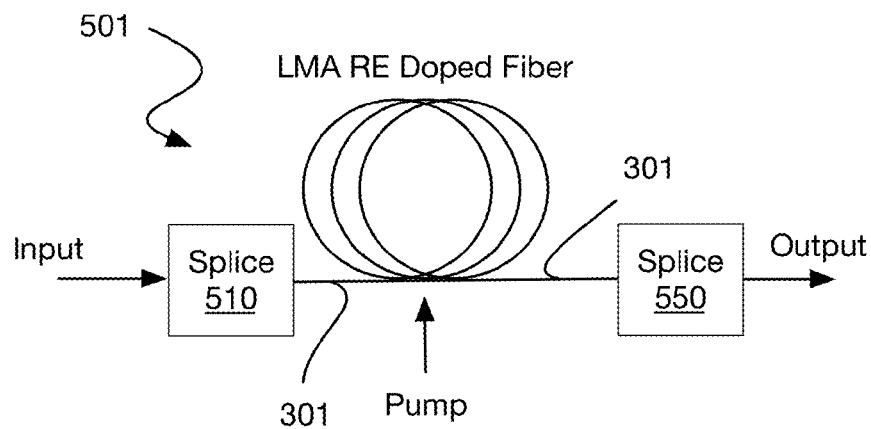
FIGS. 6A and 6B are schematics of multimode fiber amplifiers according to some embodiments.
Figure 6B:
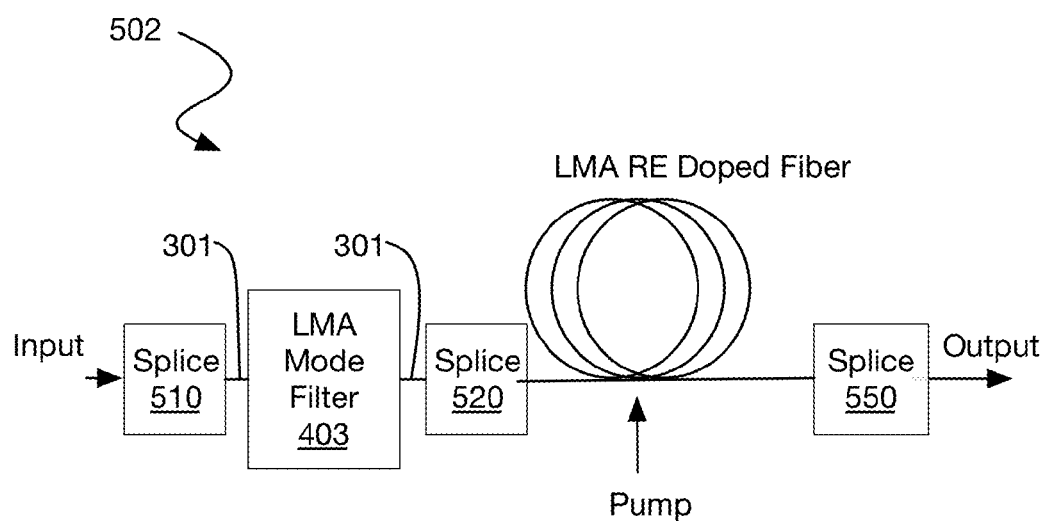

FIGS. 6A and 6B are schematics of multimode fiber amplifiers according to some embodiments. In FIG. 6A, a multimode fiber amplifier 501 includes an active LMA PM fiber 301 axially rotated over a bend length. A seed light source is coupled to LMA PM fiber 301 at input splice 510. The seed light source may be, for example, a diode pumped solid-state laser, a quantum cascade laser, a passively q-switched laser, a diode laser, a mode-locked laser, a fiber laser, or a combination of one or more thereof. In some examples the light source is operated with a continuous wave output, with a pulsed output, or a wavelength chirped pulsed output. In some embodiments, the seed light source is a Nd:YAG laser.

Rare-earth dopant(s) in multimode fiber amplifier 501 is selected so that LMA PM fiber 301 has an optical gain spectrum at least partially overlapping the spectral content of the seed light source. For example, ytterbium may be used as a rare-earth dopant for a seed laser source including wavelengths between 1030 nm and 1090 nm. LMA PM fiber 301 may be a double clad fiber where the seed light is amplified in a radially asymmetric core and pump light is contained in a cladding surrounding the core. Alternatively, both seed signal and pump light could be contained within the asymmetric core. In other embodiments, other rare-earth dopants can be used.

Active LMA PM fiber 301 is optically coupled to an optical pump having an output spectrum selected to be at least partially overlapping the absorption spectrum of active LMA PM fiber 301. For example, where ytterbium is chosen as the rare-earth dopant, a suitable choice for optical pump is a fiber-coupled laser diode that operates with an output wavelength near 976 nanometers. The output from optical pump source may be optically coupled to active LMA PM fiber 301 with any known pump combiner. Although FIG. 6A depicts the pump in a typical counter-propagating configuration, the pump could alternatively be introduced upstream of active LMA PM fiber 301 such that light from output from fiber seed light source and the pump light are co-propagating in the active LMA PM fiber 301. In still other embodiments, pump light is introduced from both sides of active LMA PM fiber 301.

In exemplary embodiments, active LMA PM fiber 301 is coiled in a 2D plane and axially rotated, for example according to parameters described elsewhere herein, to remove substantially all the higher-order mode content from active LMA PM fiber 301 such that substantially all of the power output power passing through output splice 550 is contained in the fundamental mode.

In FIG. 6B, a multimode fiber amplifier 502 includes a passive mode filter 403 employing a passive LMA PM fiber 301 with asymmetric core axially rotated over a bend length. A seed light source is input to passive LMA PM fiber 301 through input slice 510. Passive LMA PM fiber 301 is coiled in a 2D plane and axially rotated, for example according to parameters described elsewhere herein, to remove substantially all the higher-order mode content from passive LMA PM fiber 301 such that substantially all of the power output power passing through splice 520 is contained in the fundamental mode. Spice 520 optically couples passive LMA PM fiber 301 to a length of active LMA RE doped fiber. In some embodiments, the LMA RE doped fiber is also PM fiber with a radially asymmetric core. In some such embodiments, the active LMA PM fiber is the fiber laser 501 such that fiber laser 502 includes both a passive and active mode stripping stage. In other embodiments, the active LMA PM fiber comprises any known fiber laser.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure. It will be recognized that the invention is not limited to the embodiments so described, but can be practiced with modification and alteration without departing from the scope of the appended claims. The above embodiments may include the undertaking of only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

What is claimed is:

1. A fiber amplifier, comprising:
   a light source to produce an optical beam; and
   a linearly birefringent large mode area (LMA) fiber coupled to the light source to support a fundamental mode and higher-order modes of the optical beam, wherein:
   the LMA fiber has a radially asymmetric core; and
   the asymmetric core has an angular rotation of at least 90° about a fiber axis over a bend length having a radius of curvature about an axis of curvature, non-parallel to the fiber axis.

2. The fiber amplifier of claim 1, wherein:
   the axis of curvature is orthogonal to the fiber axis over the bend length; and
   the angular rotation over the bend length has a predetermined spin profile providing a suppression of at least 10 dB/meter of bend length for all higher-order modes.

3. The fiber amplifier of claim 2, wherein the LMA fiber is coiled about the axis of curvature with a fixed radius of curvature over the bend length and a rate of the angular rotation as a function of fiber length varies over the bend length.

4. The fiber amplifier of claim 1, wherein:
   the V-number of the LMA fiber is at least 4 and less than 20; and
   the core is elliptical with a major axis that is at least 5% larger than a minor axis over the entire bend length.

5. The fiber amplifier of claim 4, wherein:
   the major axis is oriented substantially parallel to the axis of curvature over a first portion of the bend length and substantially orthogonal to the axis of curvature over a second portion of the bend length.

6. The fiber amplifier of claim 5, wherein:
   a modal suppression coefficient associated with a first higher mode over the first portion of the bend length is less than a modal suppression coefficient associated with a second higher mode over the second portion of the bend length, and
   the first portion of the bend length is longer than the second portion of the bend length.

7. The fiber amplifier of claim 1, wherein:
   the LMA fiber is an active fiber doped with one or more rare-earth element over the bend length; and
   the angular rotation and radius of curvature over the bend length induces attenuation in the higher-order orthogonal modes that exceeds gain in the higher-order orthogonal modes.

8. The fiber amplifier of claim 1, wherein the LMA fiber is a polarization maintaining fiber further comprising stress rods in the cladding.

9. The fiber amplifier of claim 1, further comprising a mandrel upon which the LMA fiber is wound, wherein the mandrel has a longitudinal axis parallel to the axis of curvature and a radius of curvature about the longitudinal axes that defines the radius of curvature over the bend length.

10. The fiber amplifier of claim 1, wherein the LMA fiber comprises a pre-spun core having a predetermined spin profile over the fiber length.

11. A method of fabricating an optical mode filter that attenuates higher-order modes more than the fundamental mode through bend losses, the method comprising:
receiving a mandrel having a longitudinal axis and a radius of curvature about the longitudinal axis; and
winding onto the mandrel a linearly birefringent large mode area (LMA) fiber with a radially asymmetric core operable to support a fundamental mode and higher-order modes of an optical beam, wherein the winding comprises mechanically twisting the LMA fiber to achieve at least 90° of angular rotation about the fiber axis over a bend length having a radius of curvature defined by the mandrel.

12. The method of claim 11, wherein the twisting defines a spin profile over the bend length that provides a suppression of at least 10 dB/meter of bend length for all higher-order modes.

13. The method of claim 11, wherein the twisting is varied over the bend length.

14. The method of claim 11, wherein the winding further comprises winding a major axis of the core oriented substantially parallel to the longitudinal mandrel axis over a first portion of the bend length, and winding the major axis substantially orthogonal to the longitudinal mandrel axis over a second portion of the bend length.

15. The method of claim 14, wherein:
modal suppression associated with a first higher mode over the first portion of the bend length is less than modal suppression associated with a second higher mode over the second portion of the bend length, and
the first portion of the bend length is longer than the second portion of the bend length.

16. The method of claim 11, wherein:
the V-number of the LMA fiber is at least 4 and less than 20; and
the core is elliptical with a major axis that is at least 5% larger than a minor axis over the entire bend length.

17. The method of claim 11, wherein:
the LMA fiber is an active fiber doped with one or more rare-earth element over the bend length; and
the twisting is to angularly rotate the core over the bend length to induce attenuation in the higher-order orthogonal modes that exceeds gain in the higher-order orthogonal modes.

18. An optical fiber mode filter, comprising:
a mandrel having a longitudinal axis and a radius of curvature about the longitudinal axis;
a linearly birefringent large mode area (LMA) active fiber with a radially asymmetric core operable to support a fundamental mode and higher-order modes of an optical beam coiled around the mandrel, wherein the fiber is mechanically twisted to angularly rotate the core at least 90° about the fiber axis over a bend length having a radius of curvature defined by the mandrel.

19. The mode filter of claim 18, wherein:
the V-number of the LMA fiber is at least 4 and less than 20;
the core is elliptical with a major axis that is at least 5% larger than a minor axis over the entire bend length;
the major axis is oriented substantially parallel to the longitudinal mandrel axis over a first portion of the bend length and substantially orthogonal to the longitudinal mandrel axis over a second portion of the bend length.

20. The mode filter of claim 19, wherein:
a modal suppression coefficient associated with a first higher mode over the first portion of the bend length is less than a modal suppression coefficient associated with a second higher mode over the second portion of the bend length, and
the first portion of the bend length is longer than the second portion of the bend length.

* * * * *